US009632857B2

(12) United States Patent
Aranguren et al.

(10) Patent No.: US 9,632,857 B2
(45) Date of Patent: Apr. 25, 2017

(54) INTELLIGENT DUMP SUPPRESSION

(75) Inventors: Herman Aranguren, Tucson, AZ (US); David Bruce LeGendre, Tucson, AZ (US); David Charles Reed, Tucson, AZ (US); Max Douglas Smith, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 777 days.

(21) Appl. No.: 12/354,738

(22) Filed: Jan. 15, 2009

(65) Prior Publication Data
US 2010/0180156 A1 Jul. 15, 2010

(51) Int. Cl.
 *G06F 11/00* (2006.01)
 *G06F 11/07* (2006.01)
(52) U.S. Cl.
 CPC ...... *G06F 11/0778* (2013.01); *G06F 11/0706* (2013.01); *G06F 11/0781* (2013.01)
(58) Field of Classification Search
 CPC ............. G06F 11/0778; G06F 11/0781; G06F 11/0706
 See application file for complete search history.

(56) References Cited

U.S. PATENT DOCUMENTS

| 6,249,755 | B1 | 6/2001 | Yemini et al. |
| 6,343,236 | B1 | 1/2002 | Gibson et al. |
| 6,601,188 | B1 * | 7/2003 | Wilding .......................... 714/15 |
| 6,601,198 | B1 | 7/2003 | Goko |
| 6,813,731 | B2 * | 11/2004 | Zahavi et al. .................. 714/45 |
| 6,959,262 | B2 | 10/2005 | Curry, III |
| 7,028,056 | B1 | 4/2006 | Hendel et al. |
| 7,080,287 | B2 | 7/2006 | Salem |
| 7,707,462 | B1 * | 4/2010 | Harris ............................. 714/47 |
| 2002/0198983 | A1 * | 12/2002 | Ullmann et al. .............. 709/224 |
| 2003/0084071 | A1 * | 5/2003 | Iulo ............................... 707/200 |
| 2004/0078667 | A1 | 4/2004 | Salem |
| 2006/0156290 | A1 * | 7/2006 | Johnson et al. .............. 717/127 |
| 2008/0046483 | A1 * | 2/2008 | Lehr et al. .................... 707/204 |
| 2008/0058961 | A1 | 3/2008 | Biberdorf et al. |
| 2008/0103736 | A1 | 5/2008 | Chin et al. |
| 2008/0168308 | A1 * | 7/2008 | Eberbach et al. ............. 714/26 |

OTHER PUBLICATIONS

"Neural Networks", StatSoft, Inc., archived Dec. 5, 2006, pp. 2-17.*

* cited by examiner

*Primary Examiner* — Jason Bryan
(74) *Attorney, Agent, or Firm* — Griffiths & Seaton PLLC

(57) ABSTRACT

Various embodiments for intelligent dump suppression in a computing environment following an error are provided. A plurality of historical information is considered in view of a current alert level to generate an output decision. The current alert level is one of an available plurality of alert levels configurable by a user. The current alert level is selectable by the user for a predetermined data collection restrictiveness. Data capture is performed according to the output decision.

14 Claims, 3 Drawing Sheets

INTELLIGENT DUMP SUPPRESSION

BACKGROUND OF THE INVENTION

Field of the Invention

The present invention relates in general to computers, and more particularly to a method, system, and computer program product for intelligent dump suppression in a computing environment.

Description of the Related Art

The majority of businesses in the world today use computers and computer systems to store and manage information. In the context of administering computer systems, various mechanisms have been put into place to provide for the collection of documentation in the event of an error. In computer speak, the process of transferring data associated with the error from one location to another location where the data is collected, diagnosed, and analyzed is referred to as a dump.

While it is generally beneficial to collect documentation in the case of a received error, in some cases this collection may be undesirable for various reasons. For example, data collection for a particular error may be duplicative, in that the error, or a similar error, was already received and documented adequately. In the z/OS® operating system environment, clients suppress dumps with a Dump Analysis and Elimination (DAE) utility. DAE uses a symptom string to determine when a dump should be suppressed. The symptom string is made up of several basic components, including the failed load module name, failing control section (CSECT) name, and optional items such as a completion, return or reason code.

Mechanisms such as DAE are effective for filtering out failures that share the same external symptoms. However, there are other circumstances not accounted for in the DAE methodology that may cause dumps to be suppressed that may have actually been useful in problem diagnosis.

SUMMARY OF THE INVENTION

In light of the foregoing, a need exists for a dump suppression methodology taking additional circumstances into account in a more intelligent manner. Accordingly, in one embodiment, by way of example only, a method for intelligent dump suppression in a computing environment following an error is provided. A plurality of historical information is considered in view of a current alert level to generate an output decision. The current alert level is one of an available plurality of alert levels configurable by a user. The current alert level is selectable by the user for a predetermined data collection restrictiveness. Data capture is performed according to the output decision.

In an additional embodiment, again by way of example only, a system for intelligent dump suppression in a computing environment following an error is provided. A dump manager is operational in the computing environment. The dump manager is adapted for considering a plurality of historical information in view of a current alert level to generate an output decision. The current alert level is one of an available plurality of alert levels configurable by a user. The current alert level is selectable by the user for a predetermined data collection restrictiveness. The dump manager is further adapted for performing data capture according to the output decision.

In an additional embodiment, again by way of example only, a computer program product for intelligent dump suppression in a computing environment following an error is provided. The computer program product comprises a computer-readable storage medium having computer-readable program code portions stored therein. The computer-readable program code portions comprise a first executable portion for considering a plurality of historical information in view of a current alert level to generate an output decision. The current alert level is one of an available plurality of alert levels configurable by a user. The current alert level is selectable by the user for a predetermined data collection restrictiveness. The computer-readable program code portions further comprise a second executable portion for performing data capture according to the output decision.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

The present description and claimed subject matter describe exemplary system, method, and computer program product embodiments for intelligent dump suppression in a computing environment. The illustrated embodiments implement a more intelligent system to incorporating a rule based set of criteria which takes into account numerous conditions to help determine when a dump should or should not be taken. The embodiments continue to learn over time based on user feedback, and self-adjust to provide an optimal level of filtering.

The illustrated embodiments can also be manually adjusted to various alert levels. These alert levels allow for dumps to be taken during periods of heightened awareness that would normally be suppressed, such as conversions to upgraded software or hardware. The system will also allow the user to add their own symptom related items to be used in decision making, given that they provide the location of the necessary information for use when the decision to suppress is being made. The illustrated embodiments also allow for job level intelligence on dump suppression. Each of these considerations give the user an increased level of control over the storage dump process while limiting data redundancy and unnecessary resource utilization.

In the following description, reference is made to the accompanying drawings which form a part hereof and which illustrate several implementations of the present invention. It is understood that other implementations may be utilized and structural and operational changes may be made without departing from the scope of the present invention.

Figure 1:
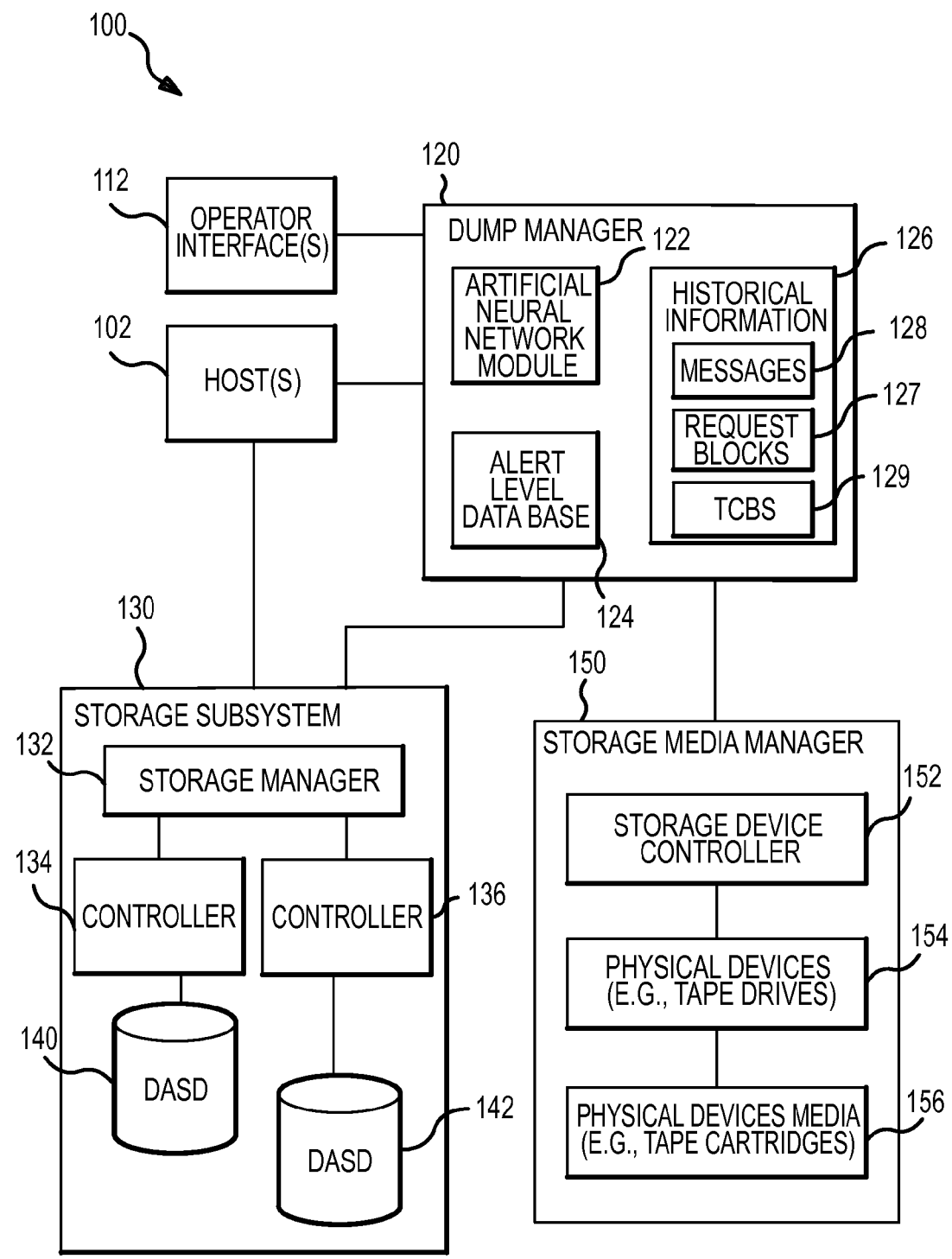
FIG. 1 is an exemplary computing environment.

FIG. 1 illustrates, in a block diagram, a computing environment 100 in accordance with certain implementations of the invention. In the illustrated example, the computing environment 100 includes one or more hosts 102, one or more operator interfaces 112, dump manager 120, storage subsystem 130, and storage media manager 150.

The hosts 102 and operator interfaces 112 may be any computational device known in the art, such as a personal computer, a workstation, a server, a mainframe, a hand held computer, a palm top computer, a telephony device, network appliance, human operator terminals, etc., or a combination of the foregoing. The hosts 102 and operator interfaces 112 may include any operating system known in the art, such as the IBM OS/390® or z/OS® operating system. In certain implementations, the hosts 102 may comprise application programs. The operator interface 112 may include features such as a computer, input/output terminal, keyboard, video monitor, dials, switches, or other human/machine interface.

In FIG. 1, the one or more hosts 102 and operator interfaces 112 are shown connected to dump manager 120 for case of illustration. In certain implementations, the dump manager 120 may be implemented as software residing on the hosts 102 and/or operator interfaces 112. In certain implementations, the dump manager 120 may be implemented in software residing on a server or other computational device. In further implementations, the dump manager 120 may be implemented with logic circuitry. The dump manager 120 includes an artificial neural network module 122, an alert level database 124, and a historical information database 126, including messages 128, request blocks 127, and task control blocks (TCBs) 129.

Among other components, the storage subsystem 130 includes a storage manager 132, along with direct access storage devices (DASDs) 140, 142 and their associated controllers 134, 136. The storage subsystem 130 may include other storage media in place of or in addition to DASD. The storage manager 132 manages read/write operations upon the DASD 140, 142 in response to stimuli from sources such as external user applications such as those running on hosts 102, a system administrator via the operator interface 112, the backup manager 120, and/or internal processes of the storage manager 132.

The storage media manager 150 includes a storage device controller 152, physical devices (e.g., tape drives) 154, and physical storage media (e.g., magnetic tapes) 156. The physical storage media 156 may be any removable and/or remote storage media.

Considering the components of FIG. 1 in greater detail, the dump manager 120 comprises a processing entity that directs another entity in the computing environment 100, such as the storage subsystem 130 to dump data/documentation associated with a received error to a dump location. The dump location may be located on DASDs 140 and 142, or elsewhere. The dump manager 120 includes or has access to artificial neural network module 122, alert level database 124, and historical information database 126 described below. Each of the artificial neural network module 122, the alert level database 124, and the historical information database 126 may be embodied in various storage constructs, depending upon the implementation specifics of the dump manager 120. The dump manager 120 is coupled (logically or physically) to one or more operator interfaces 112 and hosts 102 and receives directions and other input from the one or more operator interfaces 112 and hosts 102.

One example of the storage subsystem 130 is a machine such as a storage manager component of an IBM® S/390® machine. The storage subsystem 130 receives instructions and data from the hosts 102, dump manager 120, or a combination thereof. In one implementation, the operator interface 112 includes a software module to process operator commands for input to the storage manager 132. As an example, this software may comprise the IBM® Data Facility System Managed Storage (DFSMS) software module.

The storage manager 132, which utilizes, for example, the IBM® z/OS® operating system, directs operations of the storage subsystem 130. In certain implementations, an interface is provided to conduct communications between the storage manager 132 and the storage controllers 134, 136 that manage the DASDs 140, 142.

The DASD controllers 134, 136 manage read/write operations upon DASD storage media 140, 142 as directed by the storage manager 132. DASD storage 140, 142 may be implemented as a redundant array of inexpensive disks (RAID) storage. In this example, the DASD controller 134, 136 and storage 140, 142 may be implemented by using a commercially available product such as an IBM® Enterprise Storage Server® (ESS).

Artificial neural network module 122 processes dump suppression considerations through an artificial neural network as will be further described. The artificial neural network assigns weights to various factors under consideration. These weights may be modified by a user or through a training process as also will be described. Alert level database 124 contains one or more predefined scenarios that are customizable by a user. A particular alert level may be set to coincide, for example, with system workload. Historical information database 126 includes a variety of historical information that may be considered by the dump manager in making a suppression output decision. These may include messages 128 leading up to a particular event where an error was received. The historical information may also include a chain of request blocks 127 and/or TCBs 129 associated with a received error. As the skilled artisan will appreciate, the historical information may include other information not specifically illustrated, such as a user-defined list of applications in a calling chain of an error condition.

The functionality of dump manager 120 will now be further described in detail. Specifically, exemplary methodologies that may be implemented by the dump manager 120 as part of an exemplary process for reaching a dump suppression output decision are described. As a first step, a variety of types of historical information may be collected and used to determine whether or not to perform document/data collection in the event of an error. One type of information may be the messages leading up to an error event. An additional example may be the consideration of completion codes associated with the error event. Two abnormal endings (abends) may result from the same program with the same return codes, but if the errors leading up to the event are different, this difference may provide additional diagnostics to gather an additional dump on the occurrence with different prior messages.

Another item that may be considered is the type of contention activity for those types of abends related to contention or serialization. A check may be made of the current contention analysis or enqueues (ENQs) related to the failing task. Again, if that information was substantially different, the decision may also be made to take a dump based on that information.

In addition, the user may specify additional user specific parameters such as values in their control blocks, as long as they provide information on how to access those control blocks and what bytes to check. The chain of request blocks or TCBs may also be considered. For example, a user could specify that if a certain program is anywhere in the calling chain of an error condition, then a dump could be taken or suppressed.

As a next step, system-wide influences and user alert levels may be considered. For example, the system may be set to be more selective on dump processing depending on the system workload at the time of the error. Also, if a user is installing a new application or performing activities like disaster recovery testing, then they could adjust the profile level of dump suppression to take dumps more often with a less stringent suppression policy.

An Artificial Neural Network (ANN) may be logically placed between the data gathering and decision making components of the dump manager. ANNs are well known for their pattern recognition abilities and would be a quick and efficient means by which to recognize a wide range and composition of system-specific symptoms. In this case, the data gathering component of the dump manager 120 (FIG. 1) would compile the necessary information and feed it to the input of the ANN module 122 (FIG. 1). The ANN module 122 processes the data and arrives at a specific output condition. The output condition is then checked by the decision making component; either resulting in a dump or a dump suppression.

In one embodiment, the ANN may be a three layer feed-forward, backpropagation network. The three layers of the network include input, hidden and output layers. The input layer includes nodes for each of the measured factors such as messages, completion codes or contention levels. The hidden layer may be used as a means of adjusting the weights of connections between the input and output layers. The output layer may have the final set of states for which the system monitors. That layer would also be extendable to include new states based on differing symptoms received at the input layer.

Figure 2:
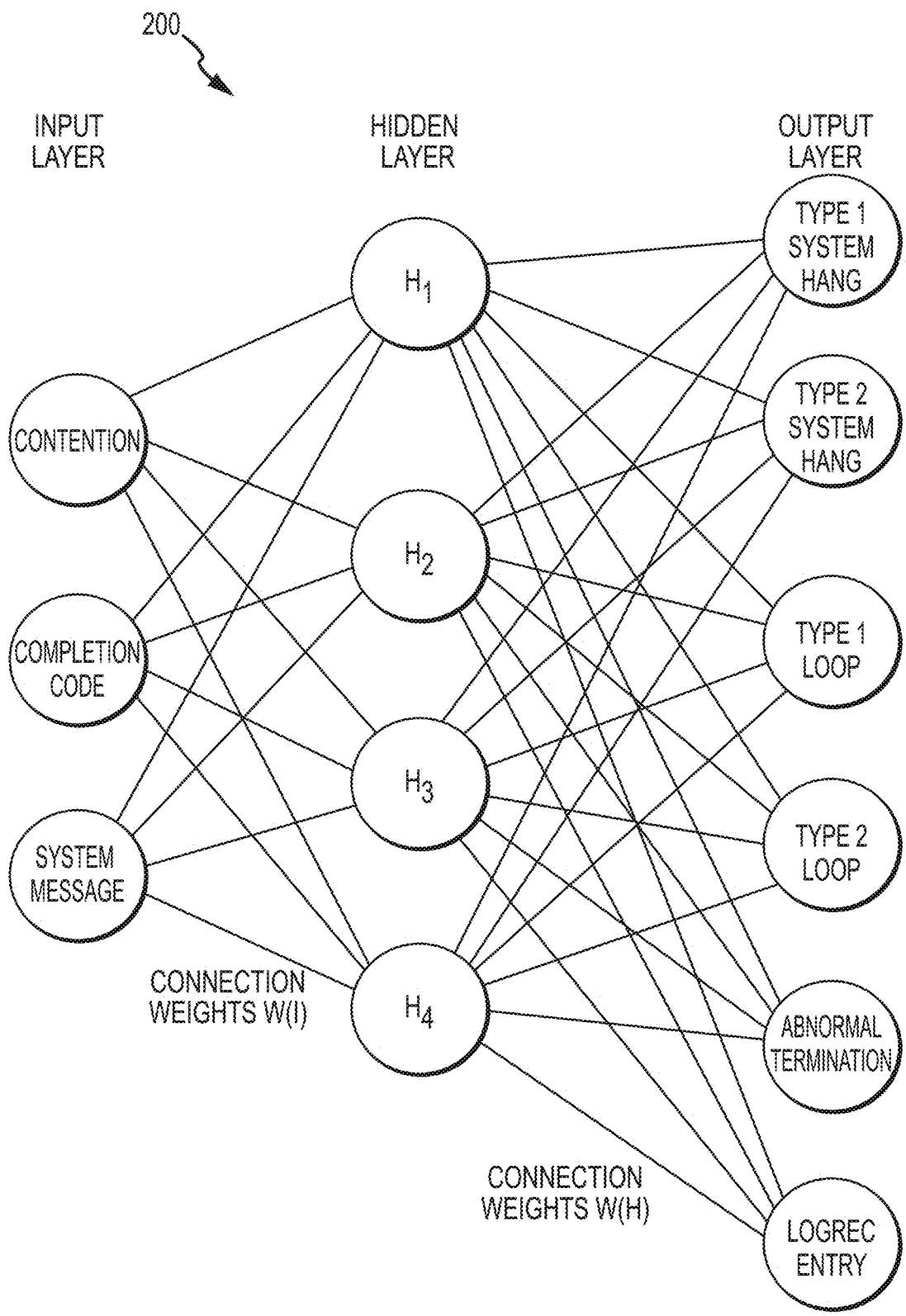
FIG. 2 is an exemplary dump manager for performing dump suppression management functionality.

Turning to FIG. 2, a visual example of an exemplary ANN 200 is depicted. ANN 200 includes an input layer with various nodes for input factors, such as contention levels, completion codes, and system messages leading up to the error event as shown. The output layer includes various nodes for output states that may be monitored by the dump manager. As illustrated, these states include a type 1 and type 2 system hang, a type 1 and type 2 loop, an abnormal termination (abend), and a log record (logrec) entry. Between the input nodes and output states are a series of weighted connections that join to one of several hidden layer nodes. Again, the weights of these connections may be adjusted for a particular implementation, for example, for a particular alert level.

The ANN may be initiated through a training phase in which all of the weights and error values of the connections would be initialized. The ANN may then be presented with various system-specific symptoms that map to an output condition. Depending on the correctness of that output condition, the level of error may be backpropagated through the network, causing an adjustment of the weights so that the network would be closer to a correct output given a similar set of symptoms. Once the ANN was fully trained and implemented, any symptom sets not mapping strongly to a given output condition would allow the user to either create a new output condition, or specify a previous output condition which would further increase the network's pattern recognition capabilities.

Figure 3:
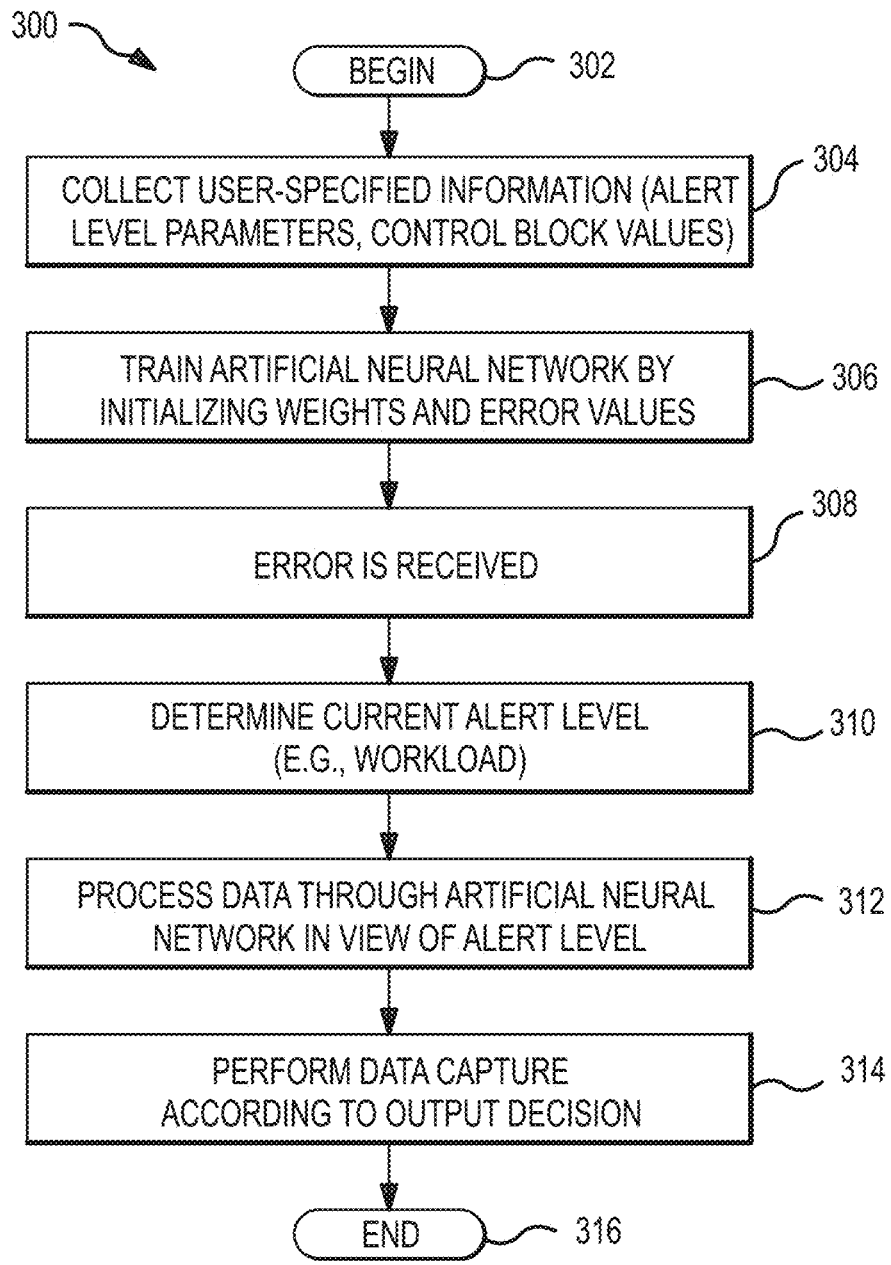
FIG. 3 is a flow chart diagram of an exemplary method for intelligent dump suppression in a computing environment.

Turning to FIG. 3, a logic flow diagram of an exemplary method 300 for performing intelligent dump suppression in a computing environment is depicted. As one skilled in the art will appreciate, the described method may be implemented by various means, such as hardware, software, firmware, or a combination thereof operational on or otherwise associated with the computing environment. For example, the method 300 may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums.

Method 300 begins (step 302) with the collection of various user-specified information (step 304), such as alert level parameters or control block values as previously described. For example, a user may specify a certain threshold of system workload to be designated as a particular alert level. As an additional example, a user may designate an additional alert level to coincide with the execution of a new program. As the skilled artisan will appreciate, a variety of alert level scenarios may be implemented. In addition, the user may input suggested events that should have documentation collected or avoided, so the system can be tuned to their specific preferences.

Control then moves to step 306, where an ANN associated with the user-specified information is trained by initializing weights and error values as previously described. Once the ANN is trained, the system is ready to make output decisions based on an error event. In step 308, an error is detected and/or received. In the depicted embodiment, the system then moves to determine the current alert level (step 310). For example, the system may determine a current system workload, and check the alert level database to determine if the workload coincides with a particular event level threshold. In another example, the system may detect if a particular, user-specified program is being executed, or the user may notify the system that such a scenario is taking place by selecting an alert level coinciding with less document collection restriction.

As a next step, historical data from a variety of types are considered, such as the aforementioned TCBs, chains of request blocks, messages, contention, etc. These inputs are all weighted accordingly and processed through the ANN in view of the current alert level (step 312). Here again, as the skilled artisan will appreciate, the alert level may be incorporated into the ANN as a particular weighting arrangement, or alternatively, the alert level may be taken into account either prior or succeeding the ANN considerations.

As a result of the ANN considerations in view of the alert level, the system reaches an output decision. In accordance with the output decision, data capture is performed or not performed (step 314). Method 300 then ends (step 316).

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Some of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for intelligent dump suppression in a computing environment following an error, comprising:
    collecting user-specified information including at least one of alert level parameters and control block values;
    training an artificial neural network (ANN) associated with the user-specified information by initializing a plurality of weights and error values of network connections and back propagating a level of error to adjust the plurality of weights and error values;
    collecting and assigning weights to a plurality of historical information using the ANN, wherein the plurality of historical information includes a plurality of messages, codes, parameters and values;
    determining a current alert level;
    processing the plurality of historical information in view of the current alert level to generate an output decision, wherein the current alert level is one of an available plurality of alert levels configurable by a user, the current alert level selectable by the user for a predetermined data collection restrictiveness; and
    performing at least one of a data capture and the intelligent dump suppression according to the output decision;
        wherein processing the plurality of historical information in view of the current alert level to generate the output decision includes considering, as specified parameters by the user, each one of a control block value including which of a plurality of bytes to check, a chain of request blocks, a task control block (TCB), and an application in a calling chain associated with the error.

2. The method of claim 1, wherein processing the plurality of historical information in view of the current alert level to generate the output decision includes integrating the plurality of historical information into the ANN, wherein the artificial neural network is adapted to perform weighting adjustments for combinations of the plurality of historical information to generate the output decision.

3. The method of claim 1, wherein the plurality of alert levels incorporate a system workload parameter, wherein a higher system workload correlates with a higher predetermined data collection restrictiveness to conserve system resources.

4. The method of claim 1, wherein the plurality of alert levels incorporate a profile level parameter configurable by the user.

5. The method of claim 1, wherein processing the plurality of historical information in view of the current alert level to generate the output decision includes considering at least one of similarity between messages, contention activity, current contention analysis, and enqueues (ENQs) associated with the error.

6. A system for intelligent dump suppression in a computing environment following an error, comprising:
    an artificial neural network module;
    a dump manager operational in the computing environment in communication with the ANN, wherein the dump manager is a processor device and the dump manager is adapted for:
        collecting user-specified information including at least one of alert level parameters and control block values;
        training the artificial neural network associated with the user-specified information by initializing a plurality of weights and error values of network connections and back propagating a level of error to adjust the plurality of weights and error values;
        collecting and assigning weights to a plurality of historical information using the artificial neural network, wherein the plurality of historical information includes a plurality of messages, codes, parameters and values,
        determining a current alert level,
        processing the plurality of historical information in view of the current alert level to generate an output decision, wherein the current alert level is one of an available plurality of alert levels configurable by a user, the current alert level selectable by the user for a predetermined data collection restrictiveness, and
        performing at least one of a data capture and the intelligent dump suppression according to the output decision;
            wherein processing the plurality of historical information in view of the current alert level to generate the output decision includes considering, as specified parameters by the user, each one of a control block value including which of a plurality of bytes to check, a chain of request blocks, a task control block (TCB), and an application in a calling chain associated with the error.

7. The system of claim 6, wherein the dump manager includes the artificial neural network module for integrating the plurality of historical information into an artificial neural network, wherein the artificial neural network module is adapted to perform weighting adjustments for combinations of the plurality of historical information to generate the output decision.

8. The system of claim 6, wherein the plurality of alert levels incorporate a system workload parameter, wherein a higher system workload correlates with a higher predetermined data collection restrictiveness to conserve system resources.

9. The system of claim 6, wherein the dump manager is further adapted for considering at least one of similarity between messages, contention activity, current contention analysis, and enqueues (ENQs) associated with the error.

10. The system of claim 7, wherein the artificial neural network includes an input layer, an output layer, and a hidden layer connecting the input layer and the output layer, wherein:

the input layer includes a plurality of input nodes for the plurality of historical information, the hidden layer performs the weighting adjustments, and the output layer includes a plurality of final state nodes monitored by the dump manager.

11. A computer program product for intelligent dump suppression in a computing environment following an error, the computer program product comprising a non-transistory computer-readable storage medium having computer-readable program code portions stored therein, the computer-readable program code portions comprising:

a first executable portion for collecting uses-specified information including at least one of alert level parameters and control block values and training an artificial neural network associated with the user-specified information by initializing a plurality of weights and error values of network connections, back propagating a level of error to adjust the plurality of weights and error values, and collecting and assigning weights to a plurality of historical information using the artificial neural network, wherein the plurality of historical information include:, a plurality of messages, codes, parameters and values;

a second executable portion for determining a current alert level;

a third executable portion for processing the plurality of historical information in view of the current alert level to generate an output decision, wherein the current alert level is one of an available plurality of alert levels configurable by a user, the current alert level selectable by the user for a predetermined data collection restrictiveness; and a fourth executable portion for performing at least one of a data capture and the intelligent dump suppression according to the output decision;

wherein processing the plurality of historical information in view of the current alert level to generate the output decision includes considering, as specified parameters by the user, each one of a control block value including which of a plurality of bytes to check, a chain of request blocks, a task control block (TCB), and an application in a calling chain associated with the error.

12. The computer program product of claim 11, wherein the third executable portion for processing the plurality of historical information in view of the current alert level to generate the output decision includes integrating the plurality of historical information into an artificial neural network, wherein the artificial neural network is adapted to perform weighting adjustments for combinations of the plurality of historical information to generate the output decision.

13. The computer program product of claim 11, wherein the plurality of alert levels incorporate a system workload parameter, wherein a higher system workload correlates with a higher predetermined data collection restrictiveness to conserve system resources.

14. The computer program product of claim 11, wherein the third executable portion for processing the plurality of historical information in view of the current alert level to generate the output decision includes considering at least one of similarity between messages, contention activity, current contention analysis, and enqueues (ENQs) associated with the error.

* * * * *